United States Patent
Ramirez Llanos et al.

(10) Patent No.: US 11,987,287 B2
(45) Date of Patent: May 21, 2024

(54) AUTONOMOUS TRUCK-TRAILER MANEUVERING AND PARKING

(71) Applicant: Continental Autonomous Mobility US, LLC, Auburn Hills, MI (US)

(72) Inventors: Eduardo Jose Ramirez Llanos, Rochester, MI (US); Dhiren Verma, Farmington Hills, MI (US); Xin Yu, Rochester Hills, MI (US); Matthew Donald Berkemeier, Beverly Hills, MI (US); Julien Ip, Royal Oak, MI (US); Kyle P Carpenter, Clarkston, MI (US); Francisco Alejandro Fuentes Perez, Queretaro (MX); Joseph Zagroba, Auburn Hills, MI (US); Victor Manuel Camacho Ruiz, Queretaro (MX); Andrew Phillip Bolduc, Rochester Hills, MI (US); Erick Daniel Rivera Gutierrez, Queretaro (MX); William Nichols, Troy, MI (US); Isemany Angelica Leal Martinez, Queretaro (MX)

(73) Assignee: Continental Autonomous Mobility US, LLC, Auburn Hills, MI (US)

( * ) Notice: Subject to any disclaimer, the term of this patent is extended or adjusted under 35 U.S.C. 154(b) by 187 days.

(21) Appl. No.: 17/594,290

(22) PCT Filed: Apr. 13, 2020

(86) PCT No.: PCT/US2020/027950
§ 371 (c)(1),
(2) Date: Oct. 8, 2021

(87) PCT Pub. No.: WO2020/210808
PCT Pub. Date: Oct. 15, 2020

(65) Prior Publication Data
US 2022/0161853 A1    May 26, 2022

Related U.S. Application Data

(60) Provisional application No. 62/833,357, filed on Apr. 12, 2019.

(51) Int. Cl.
*B62D 15/02* (2006.01)
*B60D 1/24* (2006.01)
(Continued)

(52) U.S. Cl.
CPC ......... *B62D 15/0285* (2013.01); *B60D 1/245* (2013.01); *B60W 30/06* (2013.01);
(Continued)

(58) Field of Classification Search
CPC .. B62D 15/0285; B62D 13/06; G06V 20/586; B60D 1/245; B60W 30/06; B60W 30/09;
(Continued)

(56) References Cited

U.S. PATENT DOCUMENTS 9,233,710 B2    1/2016  Lavoie et al.
9,558,409 B2    1/2017  Pliefke
(Continued)

FOREIGN PATENT DOCUMENTS

EP    3418159 A2    12/2018
JP    H10264839 A   10/1998
(Continued)

OTHER PUBLICATIONS

International Search Report and the Written Opinion of the International Searching Authority dated Jul. 9, 2020 for the counterpart PCT Application No. PCT/US2020/027950.
(Continued)

*Primary Examiner* — Thomas D Alunkal

(57) ABSTRACT

A method for autonomously parking a vehicle-trailer system is provided. The method includes receiving sensor system data from a sensor system supported by the vehicle. The sensor system data includes images of surroundings along a driving path of the vehicle-trailer system. The method includes determining a local map based on the sensor system data. The local map includes surroundings along the driving path. The method includes receiving a user selection of an image location within the images. The image location representing a position in the local map associated with a selected location within the surroundings. The method includes determining a parking path from a current location of the vehicle-trailer system to the position based on the local map and instructing a drive system to execute an autonomous parking behavior causing the vehicle-trailer system to autonomously drive along the parking path and autonomously park in the selected location.

13 Claims, 8 Drawing Sheets

(51) Int. Cl.
  *B60W 30/06* (2006.01)
  *B60W 30/09* (2012.01)
  *B62D 13/06* (2006.01)
  *G05D 1/00* (2006.01)
  *G06V 20/58* (2022.01)

(52) U.S. Cl.
  CPC ............ *B60W 30/09* (2013.01); *B62D 13/06* (2013.01); *G05D 1/0038* (2013.01); *G05D 1/0044* (2013.01); *G06V 20/586* (2022.01); *B60W 2300/14* (2013.01); *B60W 2420/42* (2013.01); *G05D 2201/0213* (2013.01)

(58) Field of Classification Search
  CPC .......... B60W 2300/14; B60W 2420/42; G05D 1/0044; G05D 2201/0213; G05D 1/0038
  See application file for complete search history.

(56) References Cited

U.S. PATENT DOCUMENTS

| | | | |
|---|---|---|---|
| 9,908,558 | B2 | 3/2018 | Popken |
| 2013/0314503 | A1* | 11/2013 | Nix .................... G06V 20/58 |
| | | | 348/46 |
| 2015/0158527 | A1 | 6/2015 | Hafner et al. |
| 2017/0008563 | A1* | 1/2017 | Popken ............... G05D 1/0212 |
| 2017/0217372 | A1* | 8/2017 | Lu ......................... H04N 7/181 |
| 2017/0253237 | A1 | 9/2017 | Diessner |
| 2017/0371348 | A1 | 12/2017 | Mou |
| 2018/0348749 | A1* | 12/2018 | Lavoie ................. G06V 20/10 |
| 2018/0362026 | A1* | 12/2018 | Heimberger ......... B60W 30/06 |
| 2019/0066503 | A1* | 2/2019 | Li ........................... G08G 1/144 |
| 2019/0275941 | A1* | 9/2019 | Lu ............................. B60R 1/00 |
| 2020/0369262 | A1 | 11/2020 | Suzuki et al. |

FOREIGN PATENT DOCUMENTS

| | | |
|---|---|---|
| JP | 2015058890 A | 3/2015 |
| JP | 2018052462 A | 4/2018 |
| JP | 2018205950 A | 12/2018 |
| JP | 2019504800 A | 2/2019 |
| WO | 2015001054 A2 | 1/2015 |
| WO | 2019008757 A1 | 1/2019 |
| WO | 2019040714 A1 | 2/2019 |

OTHER PUBLICATIONS

Notice of Reasons for Refusal drafted Sep. 20, 2023 for the counterpart Japanese Patent Application No. 2021-560123 and translation of same.
Notice of Reasons for Refusal drafted Dec. 19, 2022 for the counterpart Japanese Patent Application No. 2021-560123 and Translation.
European Examination Report dated Jun. 7, 2023 for the counterpart European Patent Application No. 20 724 973.1.

\* cited by examiner

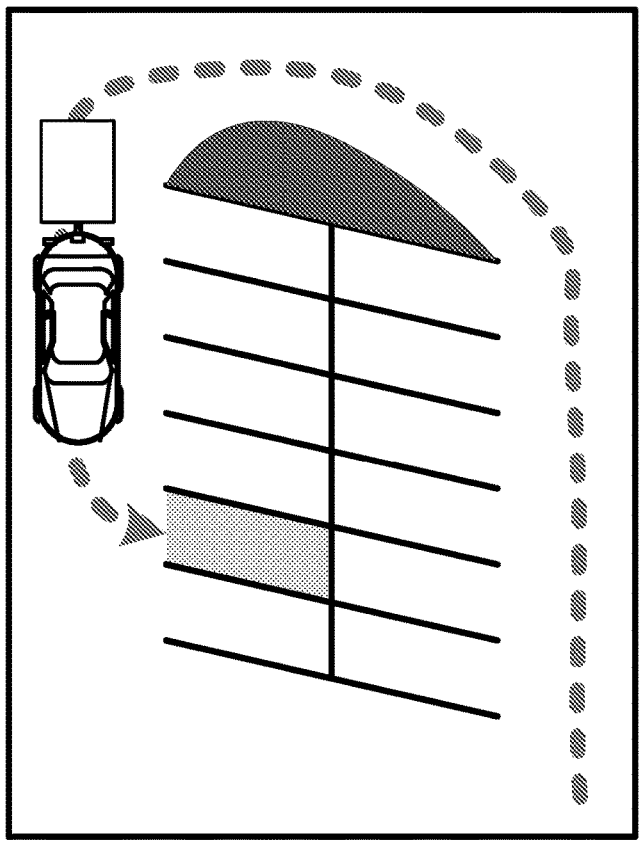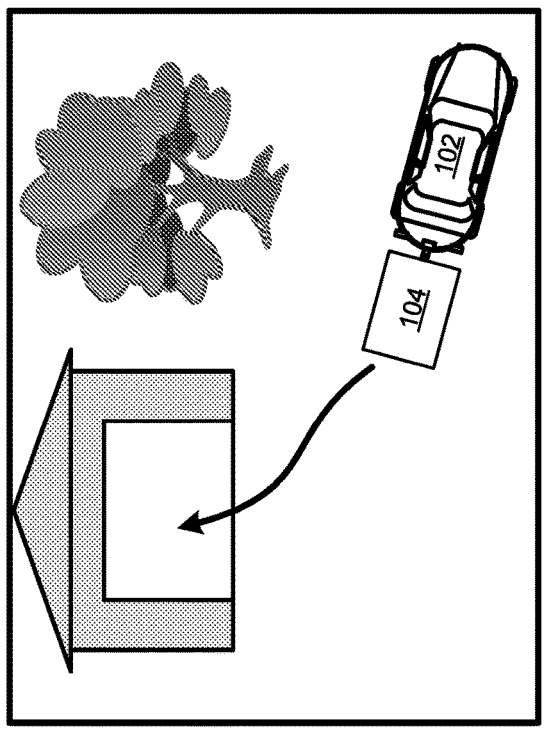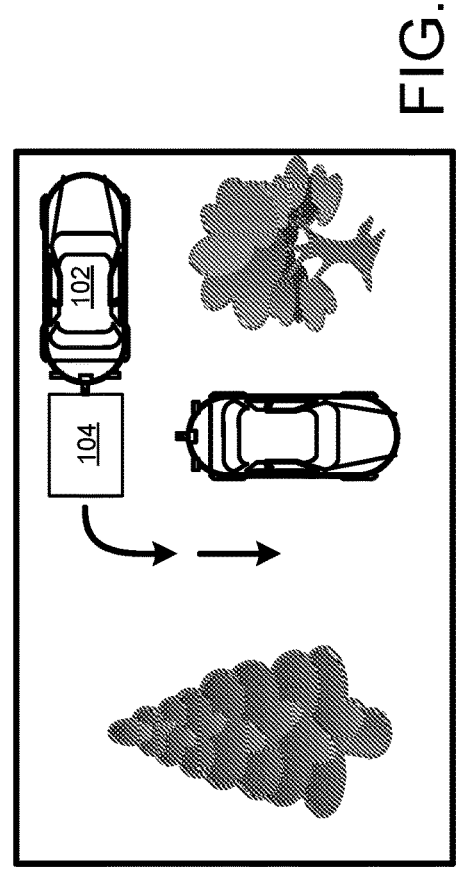
FIG. 4D
FIG. 4E
FIG. 4F

600

Receiving, At Data Processing Hardware Supported By A Vehicle Of The Vehicle-trailer System, Sensor System Data From A Sensor System Supported By The Vehicle
602

Sending, From The Data Processing Hardware To A Display, Instructions Causing The Display To Display The Images
604

Determining, At The Data Processing Hardware, A Local Map Based On The Sensor System Data, The Local Map Including Surroundings Along The Driving Path Of The Vehicle-trailer System
606

Receiving, At The Data Processing Hardware, A User Selection Of An Image Location Within The Displayed Images, The Image Location Representing A Position In The Local Map Associated With A Selected Location Within The Surroundings
608

Determining, At The Data Processing Hardware, A Parking Path From A Current Location Of The Vehicle-trailer System To The Position Based On The Local Map
610

Sending, From The Data Processing Hardware To A Drive System, Instructions To Execute An Autonomous Parking Behavior Causing The Vehicle-trailer System To Autonomously Drive Along The Driving Path And Autonomously Park In The Selected Location
612

FIG. 6

AUTONOMOUS TRUCK-TRAILER MANEUVERING AND PARKING

CROSS REFERENCE TO RELATED APPLICATIONS

This application is a National Stage Application under 35 U.S.C. 371 of International Application No. PCT/DE2020/027950 filed on Apr. 13, 2020, which claims priority/benefit from U.S. provisional application 62/833,357, filed on Apr. 12, 2019, the disclosures of which are herein incorporated by reference in their entireties.

TECHNICAL FIELD

This disclosure relates to autonomous vehicle-trailer maneuvering and parking.

BACKGROUND

Trailers are usually unpowered vehicles that are pulled by a powered tow vehicle. A trailer may be a utility trailer, a popup camper, a travel trailer, livestock trailer, flatbed trailer, enclosed car hauler, and boat trailer, among others. The tow vehicle may be a car, a crossover, a truck, a van, a sports-utility-vehicle (SUV), a recreational vehicle (RV), or any other vehicle configured to attach to the trailer and pull the trailer. The trailer may be attached to a powered vehicle using a trailer hitch. A receiver hitch mounts on the tow vehicle and connects to the trailer hitch to form a connection. The trailer hitch may be a ball and socket, a fifth wheel and gooseneck, or a trailer jack. Other attachment mechanisms may also be used. In addition to the mechanical connection between the trailer and the powered vehicle, in some examples, the trailer is electrically connected to the tow vehicle. As such, the electrical connection allows the trailer to take the feed from the powered vehicle's rear light circuit, allowing the trailer to have taillights, turn signals, and brake lights that are in sync with the lights of the powered vehicle.

Some of the challenges that face tow vehicle drivers is parking in a parking lot while being attached to the trailer because more than one person may be needed to maneuver the tow vehicle towards the specific location. Since the vehicle-trailer unit swivels around the hitch horizontally allowing the vehicle-trailer unit to move around corners, when the vehicle backs up, it pushes the trailer. Drivers are often confused as to which way to turn the vehicle steering wheel to get the desired change of direction of the trailer especially when backing into a parking spot. Applying an incorrect steering angle in the vehicle may also cause the trailer to jack-knife and lose its course. Therefore, oftentimes, one person drives the vehicle, e.g., the driver, and another one or more people are needed to view the tow vehicle and the trailer and provide the driver with directions regarding the path that the tow vehicle has to take. In some instances, the people providing directions to the driver may have difficulty providing efficient instructions for directing the path of the tow vehicle. Moreover, the driver may not be properly trained and/or may not have enough experience to back-up the tow vehicle and the trailer. In some examples, even trained drivers may struggle with backing up the tow vehicle while attached to the trailer because the trailer may have unfamiliar dimensions or is not easily maneuvered. Other difficulties may arise while parking the tow vehicle and the trailer, because the driver may have blind zones that do not allow adequate sight angles to properly park the tow vehicle and the trailer or the parking lot may be too tight to be able to maneuver the vehicle and the trailer. Therefore, it is desirable to provide a system that overcomes the challenges faced by drivers of tow vehicles while parking their vehicle-trailer unit.

SUMMARY

One aspect of the disclosure provides a method for autonomously parking a vehicle-trailer system. The method includes receiving, at data processing hardware supported by a vehicle of the vehicle-trailer system, sensor system data from a sensor system supported by the vehicle. The sensor system data includes images of surroundings along a driving path of the vehicle-trailer system. The method also includes sending, from the data processing hardware to a display, instructions causing the display to display the images. The method also includes determining, at the data processing hardware, a local map based on the sensor system data. The local map includes surroundings along the driving path of the vehicle-trailer system. The method also includes receiving, at the data processing hardware, a user selection of an image location within the displayed images, the image location representing a position in the local map associated with a selected location within the surroundings. The method also includes determining, at the data processing hardware, a parking path from a current location of the vehicle-trailer system to the position based on the local map; and sending, from the data processing hardware to a drive system, instructions to execute an autonomous parking behavior causing the vehicle-trailer system to autonomously drive along the parking path and autonomously park in the selected location.

Implementations of this aspect of the disclosure may include one or more of the following optional features. In some implementation, the method may include: determining, at the data processing hardware, one or more available parking spaces along the driving path; sending, from the data processing hardware to the display, instructions causing the display to label the available parking spaces within the images; where the driving path is in a parking lot, and where the image location is associated with an available parking space. In some examples, the local map includes a three-dimensional map having point clouds and a coordinate system. The method may include: identifying one or more objects within the point clouds; and categorizing the one or more objects into one of an obstacle, an available parking space, a drivable road. The sensor system data may include at least one of a wheel encoder data, an acceleration and wheel angel sensor data, or an inertial measuring unit data. The autonomous parking behavior may include backward parking, parallel parking, forward parking, or perpendicular parking.

In some examples, the method includes determining one or more obstacles while the vehicle is driving along the parking path. In this case, the instructions to the drive system include instructions to stop the vehicle-trailer system when the one or more obstacles are determined along the parking path.

Another aspect of the disclosure provides a system that includes data processing hardware and memory hardware in communication with the data processing hardware. The memory hardware stores instructions that when executed on the data processing hardware to perform operations. These operations include the method described above.

The details of one or more implementations of the disclosure are set forth in the accompanying drawings and the

DESCRIPTION OF DRAWINGS

FIGS. 4A-4F are schematic views of types of parking spaces.

FIG. 6 is a schematic view of an exemplary schematic view of an exemplary arrangement of operations for a method of autonomously parking a vehicle-trailer system in a selected parking space or location.

Like reference symbols in the various drawings indicate like elements.

DETAILED DESCRIPTION

A tow vehicle, such as, but not limited to a car, a crossover, a truck, a semi-truck, a van, a sports-utility-vehicle (SUV), and a recreational vehicle (RV) may be configured to tow a trailer. The tow vehicle connects to the trailer by way of a trailer hitch. It is desirable to have a vehicle-trailer system that includes a parking system. The parking system generates a local map of a parking lot as the vehicle-trailer system drives through the parking lot. The driver selects a parking space in the local map and then the vehicle-trailer system autonomously drives to the selected parking space. The vehicle-trailer system may perform several maneuvers, such as, but not limited to forward, backward, parallel, perpendicular, to park in the driver selected parking space. The parking system relies on one or more cameras supported by the vehicle or the vehicle and the trailer (e.g., surround view camera system), vehicle information (e.g., wheel ticks, steering angle, or/and inertial measuring unit (IMU) data) to determine the local map of the parking lot. While the driver of the vehicle-trailer system drives around the parking lot looking for an available parking space, the parking system generates the local map of the parking lot and detects available parking spaces and displays the local map with the available parking spaces on a display supported by the vehicle. The user selects one of the available parking spaces displayed which causes the vehicle-trailer system to autonomously drive towards the selected parking space and park the vehicle-trailer system. Once the vehicle-trailer is driving towards the selected parking space, the parking system detects static and dynamic obstacles along the traveled path of the vehicle-trailer system and either stops the vehicle-trailer system or alters the path to the selected parking space to avoid the obstacles.

Figure 1A:
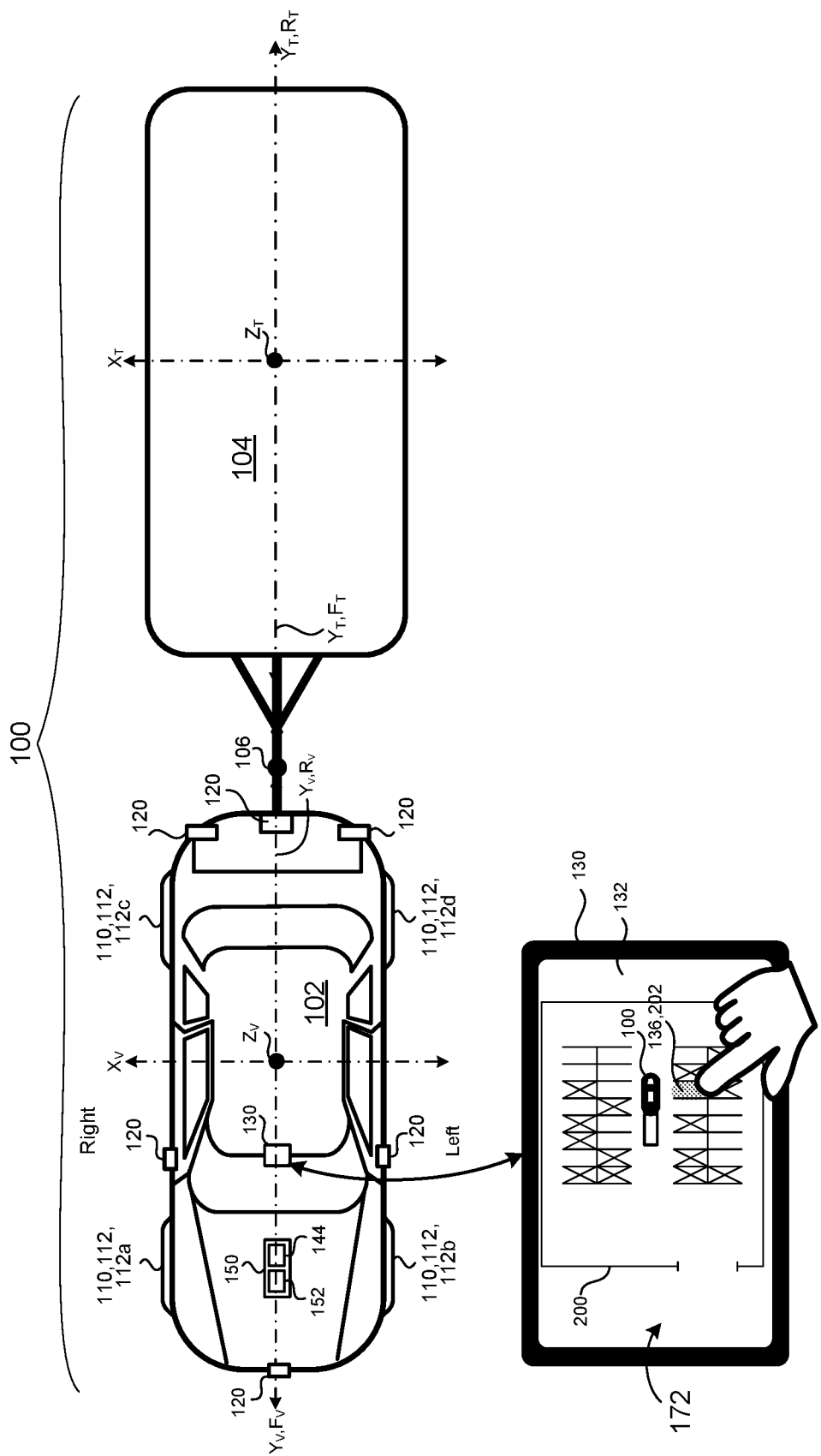
FIG. 1A is a schematic view of an exemplary vehicle-trailer system.
Figure 1B:
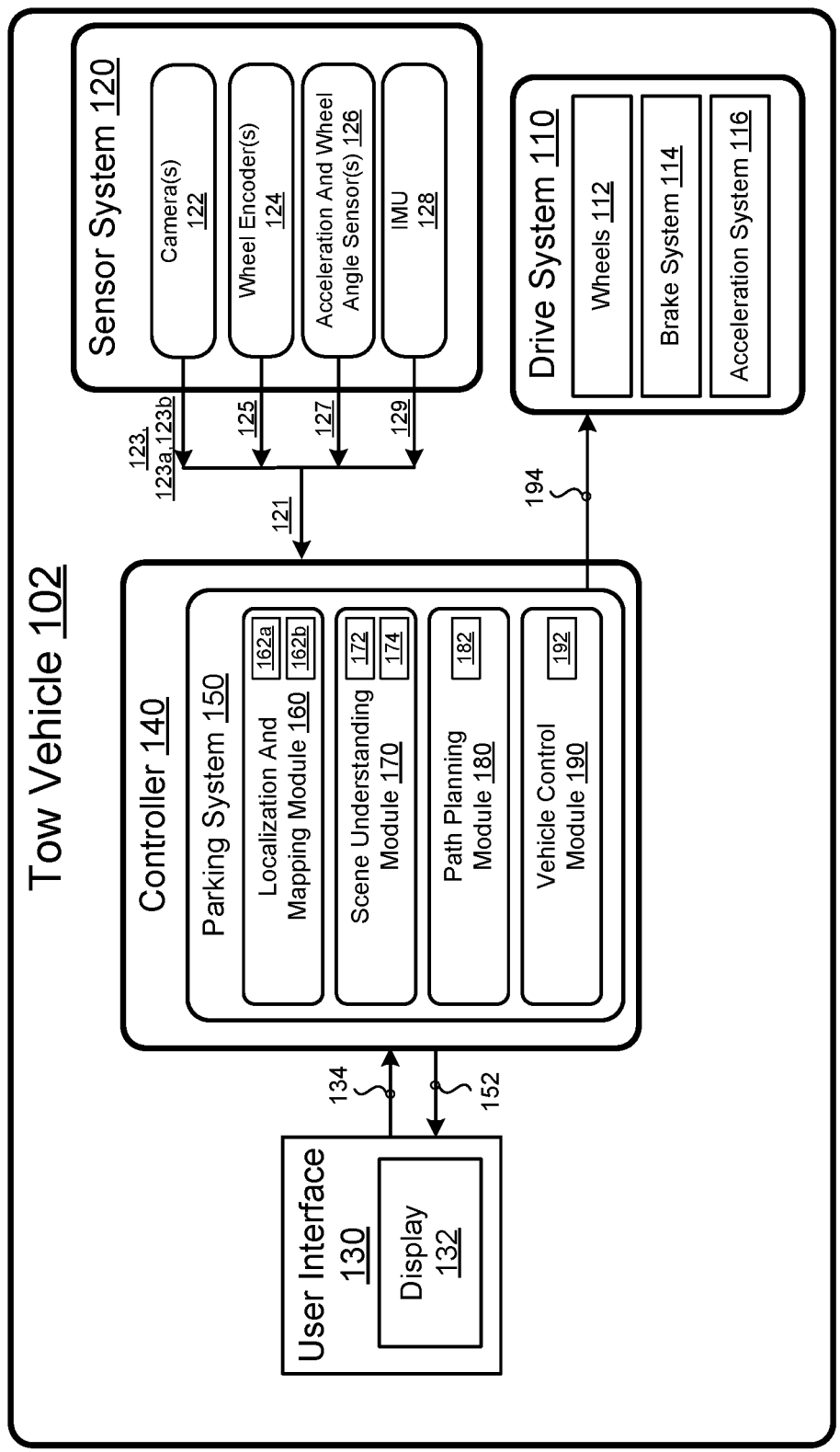
FIG. 1B is a schematic view of the exemplary vehicle-trailer system having a parking system.

Referring to FIGS. 1A and 1B, in some implementations, a vehicle-trailer system 100 includes a tow vehicle 102 attached to a trailer 104 by way of a hitch 106. The tow vehicle 102 includes a drive system 110 associated with the tow vehicle 102 that maneuvers the tow vehicle 102 and thus the vehicle-trailer system 100 across a road surface based on drive commands having x, y, and z components, for example. As shown, the drive system 110 includes a front right wheel 112, 112a, a front left wheel 112, 112b, a rear right wheel 112, 112c, and a rear left wheel 112, 112d. In addition, the drive system 110 may include wheels (not shown) associated with the trailer 104. The drive system 110 may include other wheel configurations as well. The drive system 110 includes other components (not shown) that are in communication with and connected to the wheels 112 and that allow the tow vehicle 102 to move, thus moving the trailer 104 as well. The drive system 110 may also include a brake system 114 that includes brakes (not shown) associated with each wheel 112, 112a-d, where each brake is associated with a wheel 112a-n and is configured to slow down or stop the wheels 112a-n from rotating. The tow vehicle 102 may also include an acceleration system 218 that is configured to adjust a speed and direction of the vehicle-trailer system 100. The vehicle-trailer system 100 may include other systems as well.

The tow vehicle 102 may move across the road surface by various combinations of movements relative to three mutually perpendicular axes defined by the tow vehicle 102: a transverse axis $X_V$, a fore-aft axis $Y_V$, and a central vertical axis $Z_V$. The transverse axis $X_V$ extends between a right side R and a left side of the tow vehicle 102. A forward drive direction along the fore-aft axis $Y_V$ is designated as $F_V$, also referred to as a forward motion. In addition, an aft or rearward drive direction along the fore-aft direction $Y_V$ is designated as $R_V$, also referred to as rearward motion. In some examples, the tow vehicle 102 includes a suspension system (not shown), which when adjusted causes the tow vehicle 102 to tilt about the $X_V$ axis and/or the $Y_V$ axis, or move along the central vertical axis $Z_V$. As the tow vehicle 102 moves, the trailer 104 follows along a path of the tow vehicle 102. Therefore, when the tow vehicle 102 makes a turn as it moves in the forward direction $F_V$, then the trailer 104 follows along.

Moreover, the trailer 104 follows the tow vehicle 102 across the road surface by various combinations of movements relative to three mutually perpendicular axes defined by the trailer 104: a trailer transverse axis $X_T$, a trailer fore-aft axis $Y_T$, and a trailer central vertical axis $Z_T$. The trailer transverse axis $X_T$ extends between a right side R and a left side of the trailer 104. A forward drive direction along the trailer fore-aft axis $Y_T$ is designated as FT, also referred to as a forward motion. In addition, a trailer aft or rearward drive direction along the fore-aft direction $Y_T$ is designated as RT, also referred to as rearward motion. Therefore, movement of the vehicle-trailer system 100 includes movement of the tow vehicle 102 along its transverse axis $X_V$, fore-aft axis $Y_V$, and central vertical axis $Z_V$, and movement of the trailer 104 along its trailer transverse axis $X_T$, trailer fore-aft axis $Y_T$, and trailer central vertical axis $Z_T$.

The tow vehicle 102 may include a sensor system 120 to provide reliable and robust driving and autonomous driving. The sensor system 120 may include different types of sensors 122, 124, 126, 128 that may be used separately or with one another to create a perception of the environment of the tow vehicle 102 that is used for the vehicle 102 to drive and aid the driver in make intelligent decisions based on objects and obstacles detected by the sensor system 120. In some examples, the sensors 122, 124, 126, 128 are supported by the tow vehicle 102 only, while in other examples, the trailer 104 may support one or more sensors 122, 124, 126, 128. The sensor 122, 124, 126, 128 may be positioned on a rear section of the tow vehicle 102 capturing a rearward environment of the tow vehicle 102, a side section of the tow vehicle 102 capturing a left/right environment of the tow vehicle 102, and/or a front section of the tow vehicle 102 capturing a front environment of the tow vehicle 102. The combination of sensors 122, 124, 126, 128 positioned around the tow vehicle 102 or the vehicle-trailer system 100 provide a surround view of the environment of the tow vehicle 102 or the environment of the vehicle-trailer system 100.

The sensor system 120 includes one or more cameras 122 that provide camera data 123, 123a, 123b. The one or more cameras 122 may include mono-cameras where each position on an image shows a different amount of light, but not a different hue. In some examples, the camera(s) 122 may include a fisheye lens that includes an ultra wide-angle lens that produces strong visual distortion intended to create a wide panoramic or hemispherical image 123a. Fisheye cameras capture images 123a having an extremely wide angle of view. Other types of cameras may also be used to capture images 123a of the vehicle and trailer environment. The camera data 123 may include additional data 123b such as intrinsic parameters (e.g., focal length, image sensor format, and principal point) and extrinsic parameters (e.g., the coordinate system transformations from 3D world coordinates to 3D camera coordinates, in other words, the extrinsic parameters define the position of the camera center and the heading of the camera in world coordinates). In addition, the camera data 123 may include minimum/maximum/average height of the camera 122 with respect to ground (e.g., when the vehicle is loaded and unloaded), and a longitudinal distance between the camera 122 and the tow vehicle hitch ball.

In some examples, the sensor system 120 also includes one or more wheel encoders 124 associated with one or more wheels 112, 112a-d of the tow vehicle 102. The wheel encoder 124 is an electro-mechanical device that converts an angular position or motion of the wheel to analog or digital output signals. Therefore, the wheel encoder 124 determines wheel encoder data 125 that includes the speed and distance the wheel 112 has traveled.

The sensor system 120 may also include one or more acceleration and wheel angle sensors 126 associated with the tow vehicle 102. The acceleration and wheel angle sensors 126 determine data 127 that includes the acceleration of the tow vehicle 102 in the directions of the transverse axis $X_V$ and fore-aft axis $Y_V$.

The sensor system 120 may also include an IMU (inertial measurement unit) 128 configured to measure IMU data 129 that includes the vehicle's linear acceleration (using one or more accelerometers) and rotational rate (using one or more gyroscopes). In some examples, the IMU data 129 also includes a heading reference of the tow vehicle 102. Therefore, the IMU data 129 includes a pitch, roll, and yaw of the tow vehicle 102.

The sensor system 120 may include other sensors such as, but not limited to, radar, sonar, LIDAR (Light Detection and Ranging, which can entail optical remote sensing that measures properties of scattered light to find range and/or other information of a distant target), LADAR (Laser Detection and Ranging), ultrasonic sensors, stereo cameras, infrared sensor. etc. In some examples, the tow vehicle 102 includes a Global Positioning System (GPS) receiver (not shown) that determines a latitude and longitude position of the tow vehicle 102.

The sensor data 122 may be used to alert the driver of possible obstacles when the vehicle-trailer system 100 is traveling in the forward direction $F_V$ or in the rearward direction $R_V$, by way of audible alerts and/or visual alerts via the user interface 130. Therefore, the sensor system 120 is especially useful for increasing safety in the vehicle-trailer system 100 which operates by the driver or under semi-autonomous or autonomous conditions.

Figure 2:
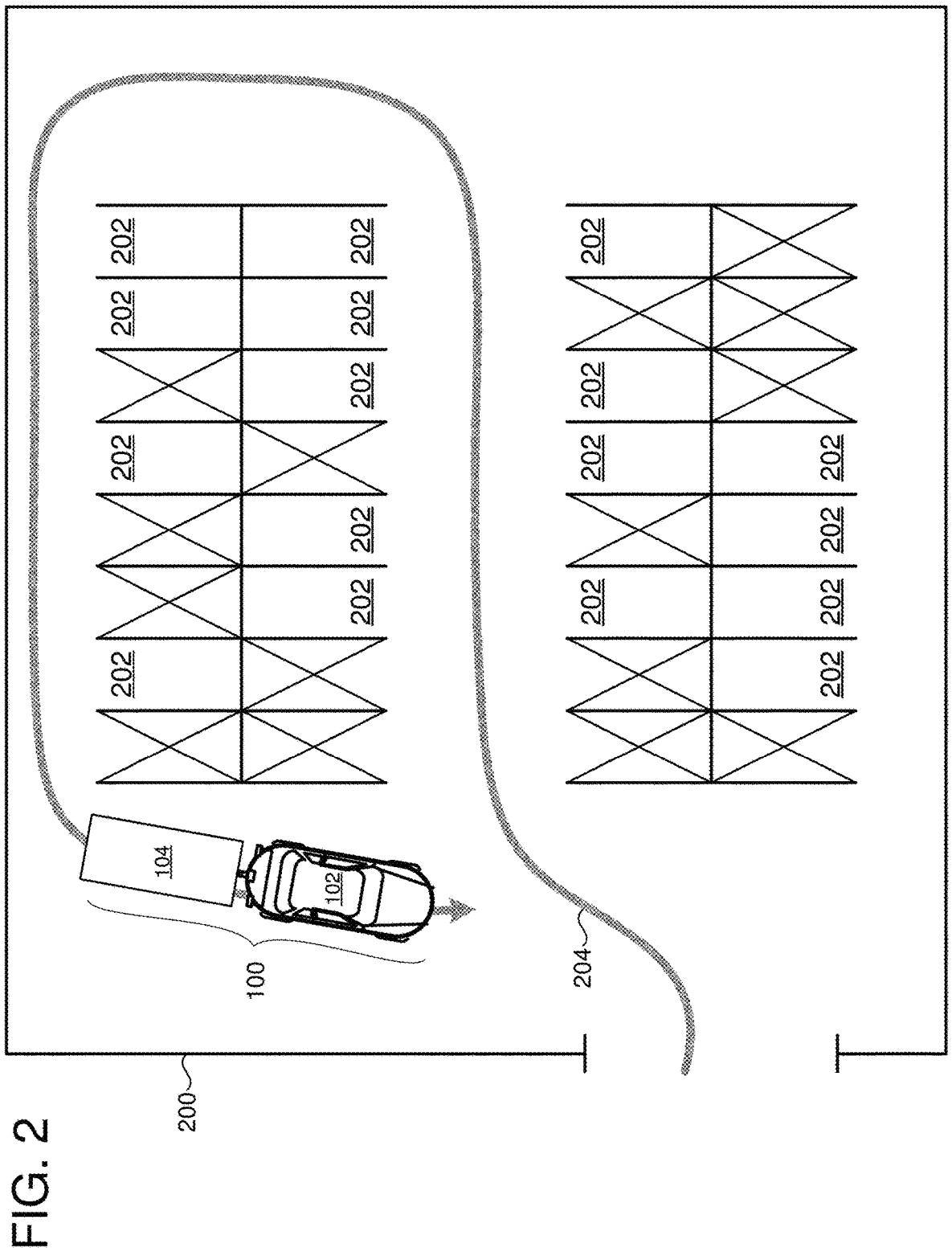
FIG. 2 is a schematic view of the exemplary vehicle-trailers system shown in FIG. 1A as vehicle maneuvers in a parking lot.

The tow vehicle 102 may include a user interface 130 that provides information to the driver and allows the driver to input commands. The user interface 130 receives one or more user commands from the driver via one or more input mechanisms, a touch screen display 132, a microphone, and/or displays or outputs one or more notifications to the driver. In some examples, the user interface 130 includes a touch screen display 132. In some examples, the display 132 shows a labeled map 172 of a parking lot 200 (FIG. 2) allowing the driver to point his finger and select an available parking space 202 within the parking lot 200. In other examples, the user interface 130 is not a touchscreen and the driver may use an input device, such as, but not limited to, a rotary knob or a mouse to select one of the available parking spaces 202.

The drive system 110, the sensor system 120, and the user interface 230 are in communication with a vehicle controller 140. The vehicle controller 140 includes a computing device (or data processing hardware) 142 (e.g., central processing unit having one or more computing processors) in communication with non-transitory memory or hardware memory 144 (e.g., a hard disk, flash memory, random-access memory) capable of storing instructions executable on the computing processor(s)). As shown, the vehicle controller 140 is supported by the tow vehicle 102; however, the vehicle controller 140 may be separate from the tow vehicle 102 and in communication with the tow vehicle 102 via a network (not shown).

In some implementations, the controller 140 executes a parking system 150 that generates a local labeled map 172 of a parking lot 200 while the vehicle-trailer system 100 drives around the parking lot 200. The driver either selects a position on the generated map or let the parking system 150 identify one or more available parking spaces 202 within the parking lot 200. This causes the vehicle-trailer system 100 to autonomously park in the selected position or parking space 202.

The parking system 150 includes a localization and mapping module 160 that analyzes sensor system data 122 from the sensor system 120 and determines a three-dimensional map 162a of the vehicle surroundings as the vehicle-trailer system 100 drives around the parking lot 200 along a route 202 (e.g., driver drives the tow vehicle 102 around the parking lot 200, or the tow vehicle 102 autonomously drives around the parking lot 200). The localization and mapping module 160 also determines a 3D pose 162b of the vehicle 102 within the determined 3D map 162a. While the vehicle-trailer system 100 is driving, the localization and mapping module 160 receives camera data 123 including images 123a and extrinsic and intrinsic data 123b, wheel encoder data 125 and/or acceleration and wheel angle sensor data 127 and/or IMU data 129. In some examples, the localization and mapping module 160 also receives other sensors system data from other sensors, such as GPS data. The localization and mapping module 160 determines the 3D map 162a based on the received sensor system data 121. The 3D map 162a includes a 3D pose of the tow vehicle 102, or in other words, a 3D position (x,y,z) of the tow vehicle 102 and a quaternion. A quaternion provides a mathematical rotation for representing orientations and rotations of an object in 3D in a local reference frame computed by the localization and mapping module 160. The localization and mapping module 160 fuses the vehicle kinematics or dynamic model with the sensor system data 121 to get an accurate location 162b of the vehicle-trailer system 100 and a 3D map 162a (that includes objects, point clouds, and a coordinate system). The vehicle kinematics or dynamic model is a mathematical model that describes the movement (e.g., position, velocity, and rotation) of the vehicle when accelerated and maneuvered.

Figure 3:
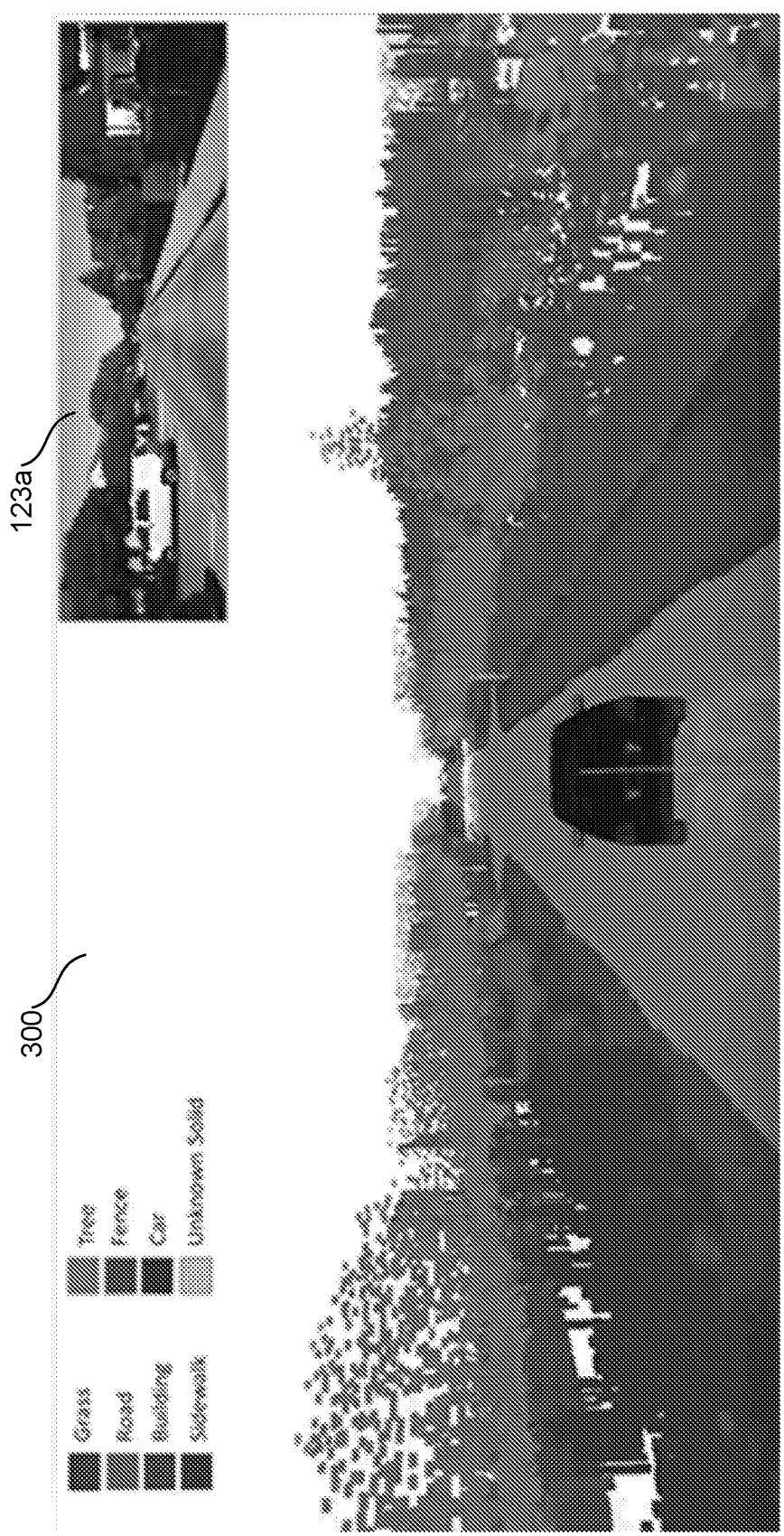
FIG. 3 is a schematic view of an exemplary 3D map that is labeled with different colors to identify different objects.

The parking system 150 also includes a scene understanding module 170 that generates a labeled 2D/3D map 172 and a labeled image 174. The scene understanding module 170 receives the images 123a (i.e., raw images) from the camera(s) 122 and assigns labels to each pixel of the image 123a; the image labels may include, but are not limited to, obstacle, free parking spot, drivable road, grass, building, sidewalk, tree, fence, unknown solid. Other image labels may also be used. In addition, the scene understanding module 170 receives the 3D map 162a from the localization and mapping module 160 and assigns labels to each 3D point of the point cloud. The point cloud labels are similar to the image labels. In some examples, the scene understanding module 170 uses different colors to show different labels. FIG. 3 shows a labeled point cloud 300 based on the shown image 123a. The labeled point cloud 300 shows different colors based on the labeled objects. In some examples, the scene understanding module 170 converts the labeled 3D map 172 to a labeled 2D map. The scene understanding module 170 fuses the received images 123a with the labeled 2D/3D map and instructs the display 132 to display the labeled map 172 showing the available parking spaces 202. In some examples, the driver may adjust the camera view (i.e., the images 123a) from a front view, a rear view, a left view, a right view, a top view, or a 3D map view while driving. The scene understanding module 170 generates the different views.

Figure 4A:
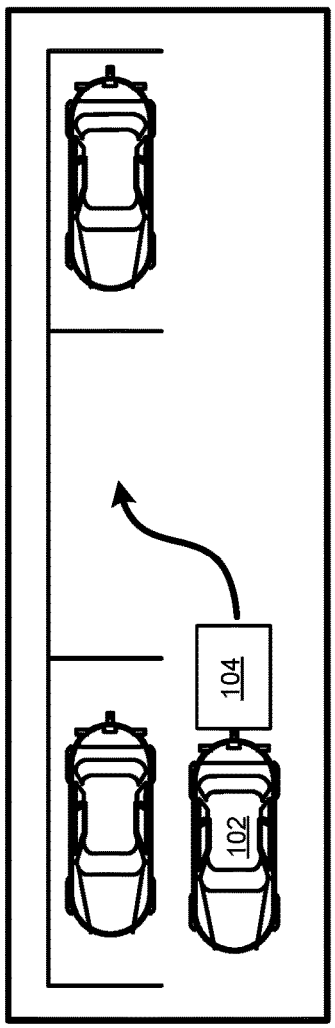
Figure 4B:
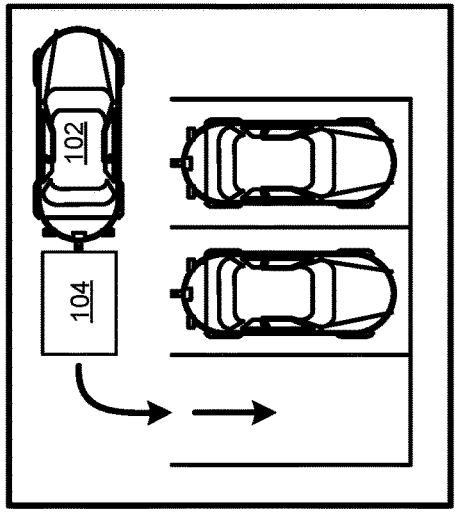
Figure 4C:
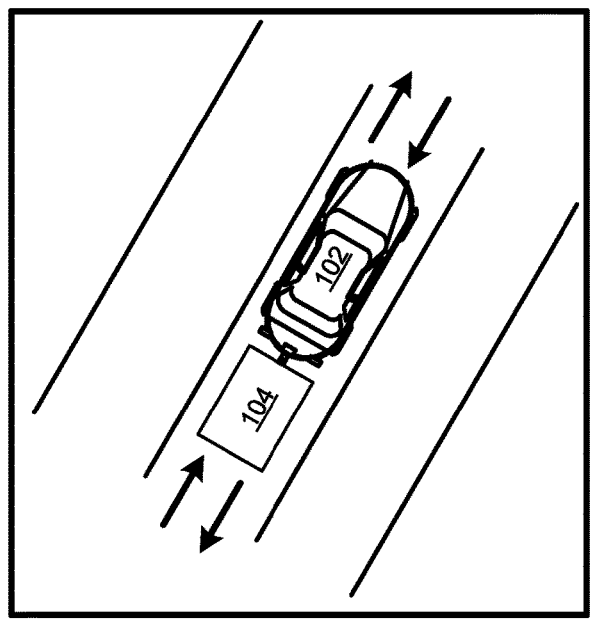

The parking system 150 also includes a path planning module 180 that determines a feasible trajectory 182 from the current localization of the vehicle-trailer system 100 to a driver selected available location or parking space 202. The path planning module 180 determines the trajectory 182 based on the 3D pose 162b determined by the localization and mapping module 160 and the labeled 2D/3D map 172 from the scene understanding module 170. The parking system 150 determines the trajectory 182 that is feasible, in other words, the trajectory 182 that avoids all obstacles to achieve the desired position being the selected available location or parking space 202. In some examples, the driver can select to find the trajectory with less distance or maneuvers. The path planning module 180 computes an open-loop trajectory planning to the driver selected available parking space 202. The path planning module 180 uses the labeled 2D/3D map 172 and outputs a feasible path 182 for the vehicle-trailer system 100 to follow. The path planning module 180 uses the vehicle-trailer system kinematic or dynamic model and constraints to compute the path 182. The path planning module 180 allows the vehicle-trailer system 100 to park forward or backward or any specific parking method shown in FIGS. 4A-4F. The path planning module 180 plans the path 182 from a current vehicle-trailer system 100 position to the end position where the vehicle-trailer system 100 is in the parking space 202. The path planning module 180 may plan the path 182 such that the vehicle-trailer system 100 has to back-up to the parking space as shown in FIG. 4A or parallel park as shown in FIG. 4B. In some examples, the path planning module 180 plans the path 182 such as the vehicle-trailer system 100 drives forward or backward to the parking space as shown in FIG. 4C. In some examples, the driver identifies the parking space that is not labeled, for example, in a camping site as shown in FIG. 4F. In this case, the path planning module 180 plans the path 182 to park within the identified space. The free space may be garage as shown in FIG. 4E. In some examples, the parking space 202 is within a marked parking lot.

The parking system 150 also includes a vehicle control module 190 that instructs the drive system 110 to execute one or more path following behaviors 192 causing the vehicle-trailer system 100 to follow the path 182. The vehicle control module 190 receives the planned path 182 and executes one or more behaviors 192 that send commands 194 to the drive system 110, causing the vehicle 102 to autonomously drive along the planned path 182.

The path following behaviors 192 may include, a braking behavior, a speed behavior, and a steering behavior. Each behavior causes the tow vehicle 102 to take an action, such as driving backward, turning at a specific angle, breaking, speeding, slowing down, among others. When the tow vehicle 102 takes an action, the vehicle-trailer system 100 also takes an action. The vehicle control module 190 may maneuver the vehicle-trailer system 100 in any direction across the road surface by controlling the drive system 110, more specifically by issuing commands 194 to the drive system 110.

The braking behavior may be executed to either stop the vehicle-trailer system 100 or to slow down the vehicle-trailer system 100 based on the planned path 182. The braking behavior sends a signal or command 194 to the drive system 110 of the tow vehicle 102, e.g., the brake system (not shown), to either stop the tow vehicle 102 or reduce the speed of the tow vehicle 102 causing the vehicle-trailer system 100 to stop or slow down.

The speed behavior may be executed to change the speed of the tow vehicle 102 by either accelerating or decelerating based on the planned path 182. The speed behavior sends a signal or command 194 to the brake system 114 for decelerating or the acceleration system 116 for accelerating.

The steering behavior may be executed to change the direction of the tow vehicle 102 based on the planned path 182. As such, the steering behavior sends the acceleration system 116 a signal or command 194 indicative of an angle of steering causing the drive system 110 to change direction.

While driving along the path 182, the vehicle control module 190 adjusts the path based on the "real" motion of the vehicle-trailer system 100. If an obstacle is identified, the Vehicle-Trailer system 100 either stops until the path is clear or adjusts the path 182 to avoid the obstacle.

Figure 5:
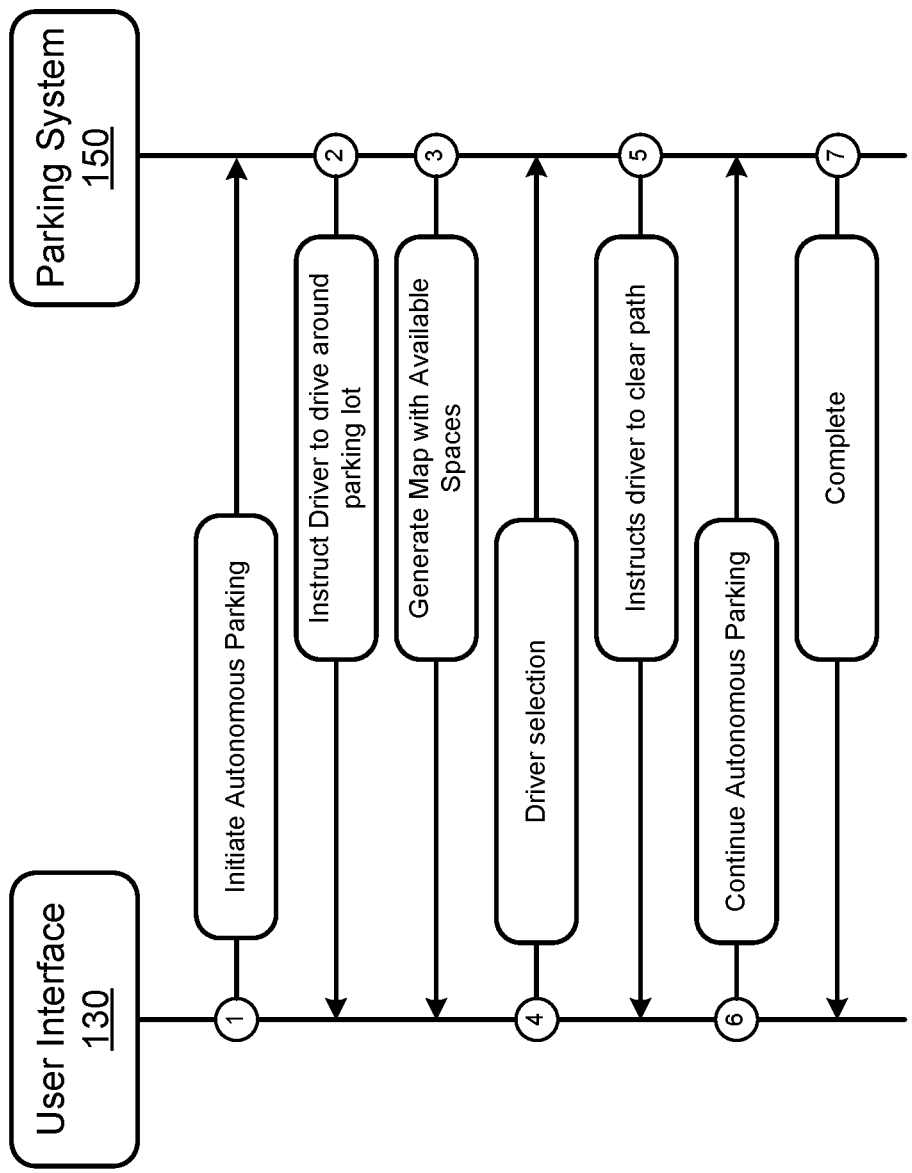
FIG. 5 is a schematic view of an exemplary communication between a user interface and the parking system shown in FIG. 1B.

FIG. 5 illustrates an exemplary communication between the user interface 130 and the parking system 150 as described with reference to FIGS. 1A-4G. At step 1, the driver instructs the parking system 150 to initiate autonomous parking by way of a command through the user interface 130, for example, an option on the display 132. In some examples, the parking system 150 may instruct the driver to input the dimensions of the trailer 104, while in other examples, the controller 160 has previously determined the dimensions of the trailer 104. In step 2, the parking system 150 may instruct the user interface 130 to display a message on the display 132 instructing the driver to start driving around the parking lot 200. Once the driver begins to drive the vehicle-trailer system 100 around the parking lot 200, the parking system 150 starts generating a map 162a and labels the map 172, while the vehicle-trailer system 100 is moving. Alternatively, the parking system 150 may inform the driver that the vehicle 102 will start autonomously driving around the parking lot 200. At step 3, the parking system 150 instructs the user interface 130 to display the generated labeled map 172 which shows real time images 123a captured by the camera 122 and the available spots 202 within these images 123a. In some examples, the driver may adjust the camera view from a front view, a rear view, a left view, a right view, a top view, or a 3D map view while driving. At step 4, the driver selects an available location or parking space 202 from the one or more displayed parking space by way of the user interface 130 or any other location that the driver wants to park the vehicle-trailer system 100. The parking system 150 plans a feasible path 182 to the location or parking space 202 and the vehicle-trailer system 100 begins following the path 182. In some examples, the parking system 150 instructs the user interface 130 to inform the driver that the autonomous parking has begun. At step 5, if the parking system 150 identified one or more objects along the path 182, the parking system 150 either adjusts the path 182 or stops the autonomous driving and instructs the user interface 130 to display a message to the driver instructing the driver to clear the path 182. In some examples, warning signals are displayed on the images 123a where the objects are detected. Once the driver clears the path 182, then the driver may instruct the parking system 150 to continue autonomous parking at step 6. Once the instruction is received, the parking system 150 continues driving along the path 182 until the vehicle-trailer system 100 is parked in the selected parking space. The driver may instruct the parking system 150 to go to another selected parking space if the driver cannot or does not want to clear the path 182. Once complete, the parking system 150 instructs the user interface 130 to provide a message to the driver that the vehicle-trailer system 100 is parked.

FIG. 6 shows an exemplary arrangement of operations for a method 600 of autonomously parking a vehicle-trailer system 100 having a vehicle 102 attached to a trailer 104, according to FIGS. 1-5. At block 602, the method 600 includes receiving, at data processing hardware (e.g., a controller 140 executing the parking system 150) supported by the vehicle 102, sensor system data 121 from a sensor system 120 supported by the vehicle 102. In some examples, the sensor system 120 is also supported by the trailer 104. The sensor system data 120 may include camera data 123 having images 123a and camera extrinsic and intrinsic data 123b. The images 123a are of surroundings along a driving path 204 of the vehicle-trailer system 100. The sensor system data 121 may also include includes at least one of a wheel encoder data 125, an acceleration and wheel angel sensor data 127, or an inertial measuring unit data 129. At block 604, the method 600 includes sending, from the data processing hardware 140 to a display 132, instructions 152 causing the display 132 to display the images 123a. At block 606, the method 600 includes determining, at the data processing hardware 140, a local map 162a based on the sensor system data 121. The local map 162a includes surroundings along the driving path 204 of the vehicle-trailer system 100. At block 608, the method 600 includes receiving, at the data processing hardware 140, a user selection 134 of an image location 136 within the displayed images 123a (i.e., the labeled map 172). The image location 136 representing a position in the local map associated with a selected location within the surroundings, such as an available parking location or parking space 202. At block 610, the method 600 includes determining, at the data processing hardware 140, a parking path 182 from a current location of the vehicle-trailer system 100 to the position 202 based on the local map 172. At block 312, the method 600 includes sending, from the data processing hardware 140 to a drive system 110, instructions 194 to execute an autonomous parking behavior 192 causing the vehicle-trailer system 100 to autonomously drive along the parking path 182 and autonomously park in the selected location 202. The autonomous parking behavior 192 may include backward parking, parallel parking, forward parking, or perpendicular parking In some examples, the method 600 includes determining, at the data processing hardware 140, one or more available parking spaces 202 along the driving path 204 and sending, from the data processing hardware to the display 132, instructions 152 causing the display 132 to label the available parking spaces within the images 123a. The driving path 204 may be in a parking lot 200 or any other area. The image location 136 is associated with an available parking space 202.

In some implementations, the local map 172 includes a three-dimensional map having point clouds and a coordinate system. The method 600 may also include identifying one or more objects within the point clouds and categorizing the one or more objects into one of an obstacle, an available parking space, a drivable road.

In some example, the method 600 also includes determining one or more obstacles while the vehicle is driving along the parking path. The instructions 194 to the drive system 110 includes instructions to stop the vehicle-trailer system when one or more obstacles are determined along the parking path.

Although the parking system 150 described above is applied to a vehicle-trailer system 100, the parking system 150 may be applied to a vehicle 102 not attached to a trailer 104.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The terms "data processing apparatus", "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims.

What is claimed is:

1. A method for autonomously parking a vehicle-trailer system, the method comprising:
    receiving, at data processing hardware supported by a vehicle of the vehicle-trailer system, sensor system data from a sensor system supported by the vehicle, the sensor system data including images of surroundings along a driving path of the vehicle-trailer system;
    determining, at the data processing hardware, a three-dimensional local map based on the sensor system data, the local map being a map of a parking lot including surroundings along the driving path of the vehicle-trailer system in the parking lot, the three-dimensional local map including point clouds;
    determining, at the data processing hardware, a three-dimensional pose of the vehicle in the three-dimensional local map;
    assigning, by the data processing hardware, a label to each point of the point clouds of the three-dimensional local map and each pixel in the images;
    fusing, by the data processing hardware, the images with the labeled three-dimensional local map;
    sending, from the data processing hardware, instructions causing the display to display the fused, labeled local map showing available parking spaces;
    receiving, at the data processing hardware, a user selection of an image location within the displayed fused, labeled local map, the image location representing a position in the three-dimensional local map associated with a selected location within the surroundings;
    determining, at the data processing hardware, a parking path from a current location of the vehicle-trailer system based on the three-dimensional pose of the vehicle to the position based on the three-dimensional local map; and
    sending, from the data processing hardware to a drive system, instructions to execute an autonomous parking behavior causing the vehicle-trailer system to autonomously drive along the parking path and autonomously park in the selected location.

2. The method of claim 1, wherein the local map includes the point clouds and a coordinate system.

3. The method of claim 2, further comprising:
    identifying one or more objects within the point clouds; and
    categorizing the one or more objects into one of an obstacle, an available parking space, a drivable road.

4. The method of claim 1, wherein the sensor system data includes at least one of a wheel encoder data, an acceleration and wheel angel sensor data, or an inertial measuring unit data.

5. The method of claim 1, wherein the autonomous parking behavior includes backward parking, parallel parking, forward parking, or perpendicular parking.

6. The method of claim 1, further comprising:
    determining one or more obstacles while the vehicle is driving along the parking path;
    wherein the instructions to the drive system includes instructions to stop the vehicle-trailer system when the one or more obstacles are determined along the parking path.

7. A system for autonomously parking a vehicle-trailer system, the system comprising:
    data processing hardware; and
    memory hardware in communication with the data processing hardware, the memory hardware storing instructions that when executed on the data processing hardware cause the data processing hardware to perform operations comprising:
        receiving sensor system data from a sensor system supported by the vehicle, the sensor system data including images of surroundings along a driving path of the vehicle-trailer system;
        determining a three-dimensional local map based on the sensor system data, the local map being a map of a parking lot including surroundings along the driving path of the vehicle-trailer system, the three-dimensional local map including point clouds;
        determining a three-dimensional pose of the vehicle in the three-dimensional local map;
        assigning a label to each point of the point clouds of the three-dimensional local map and each pixel in the images;
        fusing the images with the labeled three-dimensional local map;
        sending instructions causing the display to display the fused, labeled local map showing available parking spaces;
        receiving a user selection of an image location within the displayed fused, labeled local map showing available parking spaces, the image location representing a position in the local map associated with a selected location within the surroundings;
        determining a parking path from a current location of the vehicle-trailer system that is based on the three-dimensional pose of the vehicle to the position based on the three-dimensional local map; and sending instructions to a drive system to execute an autonomous parking behavior causing the vehicle-trailer system to autonomously drive along the parking path and autonomously park in the selected location.

8. The system of claim 7, wherein the operations further comprise:

identifying one or more objects within the point clouds; and categorizing the one or more objects into one of an obstacle, an available parking space, or a drivable road.

9. The system of claim 7, wherein the sensor system data includes at least one of a wheel encoder data, an acceleration and wheel angel sensor data, or an inertial measuring unit data.

10. The system of claim 7, wherein the autonomous parking behavior includes backward parking, parallel parking, forward parking, or perpendicular parking.

11. The system of claim 7, wherein the operations further comprise:

determining one or more obstacles while the vehicle is driving along the parking path;

wherein the instructions to the drive system includes instructions to stop the vehicle-trailer system when the one or more obstacles are determined along the parking path.

12. The method of claim 1, wherein each label corresponds to a type of object and has a distinct color in the fused, labeled local map.

13. The system of claim 7, wherein each label corresponds to a type of object and has a distinct color in the fused, labeled local map.

* * * * *